(12) United States Patent
Pinol Pedret et al.

(10) Patent No.: US 10,700,451 B1
(45) Date of Patent: Jun. 30, 2020

(54) ELECTRICAL CONNECTOR ASSEMBLY

(71) Applicant: Lear Corporation, Southfield, MI (US)

(72) Inventors: Montserrat Pinol Pedret, Valls (ES); Antoni Pujol Simon, Valls (ES); Alberto Aragones Carrete, Valls (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/270,751

(22) Filed: Feb. 8, 2019

(51) Int. Cl.
| | |
|---|---|
| *H01R 11/01* | (2006.01) |
| *H01R 11/09* | (2006.01) |
| *H01R 4/30* | (2006.01) |
| *H01R 11/05* | (2006.01) |
| *H01R 4/56* | (2006.01) |

(52) U.S. Cl.
CPC ............ *H01R 11/01* (2013.01); *H01R 4/302* (2013.01); *H01R 11/05* (2013.01); *H01R 11/09* (2013.01); *H01R 4/308* (2013.01); *H01R 4/56* (2013.01)

(58) Field of Classification Search
CPC ........ H01R 11/01; H01R 4/302; H01R 11/05; H01R 11/09
USPC ......................................................... 439/813
See application file for complete search history.

(56) References Cited

U.S. PATENT DOCUMENTS

| | | | | |
|---|---|---|---|---|
| 3,407,383 A * | 10/1968 | Haegert | ............... | H01R 11/281 439/763 |
| 3,790,915 A * | 2/1974 | Dugan | ................. | H01H 50/047 439/372 |
| 4,343,529 A * | 8/1982 | Reavis, Jr. | ........... | H01R 4/2441 439/406 |
| 4,345,806 A * | 8/1982 | McHenney | .............. | H01R 4/30 439/510 |
| 4,693,948 A * | 9/1987 | McEwan | .............. | H01R 13/642 429/1 |
| 4,747,793 A * | 5/1988 | Fukuda | ................. | H01R 11/287 439/754 |
| 5,069,209 A * | 12/1991 | Posin | ................... | A61N 1/3752 439/837 |
| 5,219,302 A * | 6/1993 | Robertson | ........... | H01R 4/2441 439/403 |
| 6,579,644 B2* | 6/2003 | Hasegawa | ............. | H01M 2/307 429/1 |
| D485,235 S * | 1/2004 | Liang | .......................... | D13/120 |

(Continued)

FOREIGN PATENT DOCUMENTS

CN          109065824 A      12/2018

*Primary Examiner* — Alexander Gilman
(74) *Attorney, Agent, or Firm* — Brooks Kushman P.C.

(57) ABSTRACT

An electrical connector assembly is provided with a conductive body with a first aperture formed therein, and a second aperture formed therein intersecting the first aperture. A first post has an aperture formed radially therethrough. The first post is sized to be received within the first aperture of the conductive body with an end of the first post accessible externally from the conductive body for receipt of a first electrical connector. A fastener is sized to be received within the second aperture of the conductive body and extend through the aperture in the first post to retain the first post in the conductive body for electrical communication between the first electrical connector and the conductive body. A second post is exposed externally from the conductive body for receipt of a second electrical connector for electrical communication with the first electrical connector.

24 Claims, 4 Drawing Sheets

(56) References Cited

U.S. PATENT DOCUMENTS

| | | | | |
|---|---|---|---|---|
| 7,527,523 B2* | 5/2009 | Yohn | ................... | H01R 4/30 |
| | | | | 439/564 |
| 7,611,390 B2* | 11/2009 | Nakazawa | ............... | H01M 2/30 |
| | | | | 429/178 |
| 8,047,868 B1* | 11/2011 | Korczynski | ............ | H01R 4/302 |
| | | | | 439/522 |
| 8,777,642 B2* | 7/2014 | Pujol | ...................... | H01R 12/53 |
| | | | | 439/97 |
| 8,961,198 B2* | 2/2015 | Ferran Palau | ........... | H01R 4/58 |
| | | | | 439/76.2 |
| 9,509,126 B1* | 11/2016 | Carbonell Mate | ....... | H02B 1/48 |
| 10,395,878 B2* | 8/2019 | Shah | ................... | H01H 85/2045 |
| 2004/0018417 A1* | 1/2004 | Stack | ................... | H01H 85/044 |
| | | | | 429/61 |

* cited by examiner

ELECTRICAL CONNECTOR ASSEMBLY

TECHNICAL FIELD

Various embodiments relate to electrical connector assemblies.

BACKGROUND

An electrical connector assembly is disclosed in Pujol et al., U.S. Pat. No. 8,777,642 B2, which issued to Lear Corporation on Jul. 15, 2014. Another electrical connector assembly is disclosed in Ferran Palau et al., U.S. Pat. No. 8,961,198 B2, which issued to Lear Corporation on Feb. 24, 2015.

SUMMARY

According to at least one embodiment, an electrical connector assembly is provided with a conductive body with a first aperture formed therein, and a second aperture formed therein intersecting the first aperture. A first post has an aperture formed radially therethrough. The first post is sized to be received within the first aperture of the conductive body with an end of the first post accessible externally from the conductive body for receipt of a first electrical connector. A fastener is sized to be received within the second aperture of the conductive body and extend through the aperture in the first post to retain the first post in the conductive body for electrical communication between the first electrical connector and the conductive body. A second post is exposed externally from the conductive body for receipt of a second electrical connector for electrical communication with the first electrical connector.

According to a further embodiment, the first aperture in the conductive body has a diameter greater than a diameter of the second aperture in the conductive body.

According to an even further embodiment, the second aperture of the conductive body passes through the first aperture of the conductive body.

According to an even further embodiment, the fastener passes through the first aperture of the conductive body.

According to another further embodiment, the second aperture is internally threaded.

According to an even further embodiment, the fastener is externally threaded to engage the internal threads of the second aperture.

According to another further embodiment, the conductive body is formed of a material with a greater conductivity than a material of the first post.

According to another further embodiment, the first post is externally threaded at the end exposed externally from the conductive body.

According to another further embodiment, a tool receptacle is formed into the end of the first post exposed externally from the conductive body to align the aperture of the first post with the fastener.

According to an even further embodiment, the tool receptacle is further defined as a driver slot.

According to another further embodiment, the first post is exposed externally from a first side of the conductive body. The second post is exposed externally from a second side of the conductive body that is spaced apart and opposed from the first side.

According to another further embodiment, the second post is formed integrally with the first post.

According to another further embodiment, the second post is aligned axially with the first post.

According to another further embodiment, the second post is offset axially from the first post.

According to another further embodiment, the second post has an aperture formed radially therethrough for receipt of a fastener.

According to an even further embodiment, a third aperture is formed in the conductive body intersecting the second aperture. The second post is sized to be received in the third aperture with the aperture of the second post aligned with the second aperture of the conductive body. The fastener is sized to be received through the aperture of the second post to retain the second post in the conductive body for electrical communication between the second electrical connector and the conductive body.

According to an even further embodiment, a third aperture is formed in the conductive body, and a fourth aperture is formed in the conductive body intersecting the third aperture. The second post is sized to be received in the third aperture with the aperture of the second post aligned with the fourth aperture of the conductive body. The electrical connector assembly is further provided with a second fastener sized to be received within the fourth aperture of the conductive body and extend through the aperture of the second post to retain the second post in the conductive body for electrical communication between the second electrical connector and the conductive body.

According to another embodiment, an electrical converter assembly is provided with an electrical converter. An electrical connector assembly is provided with a conductive body with a first aperture formed therein, and a second aperture formed therein intersecting the first aperture. A first post has an aperture formed radially therethrough. The first post is sized to be received within the first aperture of the conductive body with an end of the first post accessible externally from the conductive body for receipt of a first electrical connector. A fastener is sized to be received within the second aperture of the conductive body and extend through the aperture in the first post to retain the first post in the conductive body for electrical communication between the first electrical connector and the conductive body. A second post is exposed externally from the conductive body for receipt of a second electrical connector for electrical communication with the first electrical connector. The second post provides an electrical connection with the electrical converter. An electrical connector is connected to the first post for electrical communication with the electrical converter. A housing is mounted to the electrical converter to conceal the electrical connector assembly.

According to another embodiment, an electrical connector assembly is provided with a conductive body with a first aperture formed therein and a second aperture formed therein spaced apart from and not intersecting the first aperture. A first post is sized to be received within the first aperture of the conductive body with an end of the first post exposed externally from the conductive body for receipt of a first electrical connector. A second post is sized to be received with the second aperture of the conductive body with an end of the second post exposed externally from the conductive body for receipt of a second electrical connector for electrical communication with the first electrical connector. The second post does not directly contact the first post to isolate the second post from contaminants that may be exposed to the first post.

According to another embodiment, an electrical connector assembly is provided with a conductive body with a first aperture formed therein, and a second aperture formed therein intersecting and passing through the first aperture. The first aperture in the conductive body has a diameter greater than a diameter of the second aperture in the conductive body. The second aperture is internally threaded. A first post is provided with an aperture formed radially therethrough. The first post is sized to be received within the first aperture of the conductive body with an end of the first post accessible externally from a first side of the conductive body for receipt of a first electrical connector. An externally threaded fastener is sized to be received within the second aperture of the conductive body to engage the internal threads of the second aperture, and to extend through the aperture in the first post, and extend through the first aperture of the conductive body, to retain the first post in the conductive body for electrical communication between the first electrical connector and the conductive body. A second post is exposed externally from a second side of the conductive body that is spaced apart and opposed from the first side, for receipt of a second electrical connector for electrical communication with the first electrical connector. The conductive body is formed of a material with a greater conductivity than a material of the first post. A tool receptacle is formed into the end of the first post exposed externally from the conductive body to align the aperture of the first post with the fastener.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Electrical connections are required in various current conducting applications, such as high-current applications. High-current connections may be utilized to conduct hundreds of Amperes. These high current connections typically employ threaded fastener connections with minimized resistance to reduce conduction losses and to minimize heating.

Conventional high-current connections employ hard materials to withstand applicable torques and forces, which result in a significant voltage drop and heat increase for high currents. Some prior art applications fasten a threaded connection within a plastic housing that is fastened at a lateral side, resulting in potential failures upon application of high torques or forces upon the threaded connection. The prior art fastened connections for high-current applications are typically complex requiring dedicated tooling and manufacturing, which is typically large and costly.

Figure 1:
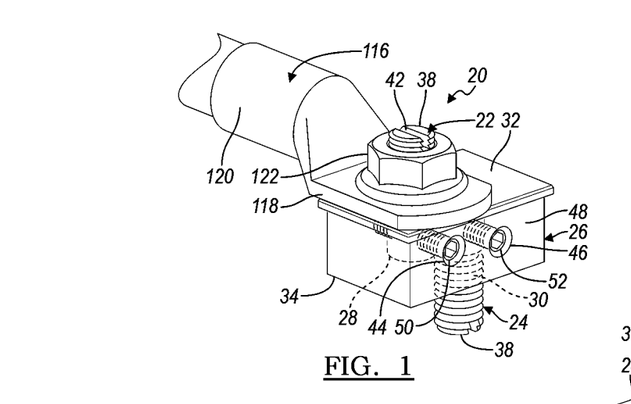
FIG. 1 is a front perspective view of an electrical connector assembly, according to an embodiment.
Figure 2:
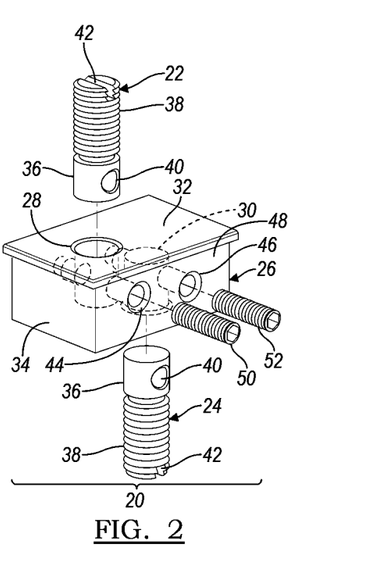
FIG. 2 is an exploded perspective view of the electrical connector assembly of FIG. 1.

FIGS. 1 and 2 illustrate an electrical connector assembly 20 that is modular and suitable for high-current applications, while providing benefits and advantages over the prior art. The modularity of the electrical connector assembly 20 permits the electrical connector assembly 20 to be adapted to various high-current applications. The electrical connector assembly 20 includes a pair of electrical terminals 22, 24 and an intermediate connector body 26. Both electrical terminals 22, 24 are externally exposed posts 22, 24 that are installed in the connector body 26. In the depicted embodiment, the posts 22, 24 are shafts that are installed in the connector body 26 and extend out of the connector body 26 for connection with electrical connectors. However, the posts 22, 24 could be flush with the connector body 26, with receptacles to receive electrical connectors therein.

The connector body 26 is formed from a conductive material with a pair of post apertures 28, 30 each sized to receive one of the posts 22, 24. Each of the post apertures 28, 30 is formed to a blind depth through a spaced apart, and opposed side surface 32, 34 of the body 26, such as a top side surface 32, and a bottom side surface 34. Of course, any suitable side surface of the body may be utilized. The post apertures 28, 30 are depicted offset and not intersecting according to an embodiment.

Each of the posts 22, 24 includes a shank 36 with a diameter sized to be received in the corresponding post aperture 28, 30. Each of the posts 22, 24 also includes a threaded end 38 extending out of the body 26. Each of the posts 22, 24 also includes a through-aperture 40 formed radially through the shank 36 for receipt of a fastener. The through-apertures 40 have a diameter that is less than that of the shank 36. Each of the posts 22, 24 also include a tool receptacle, such as a driver slot 42 formed in a distal surface of the threaded end 38. The driver slot 42 is for receipt of a driver, such as a flathead screwdriver for aligning the through-aperture 40 during installation and assembly.

The conductive body 26 includes a pair of fastener apertures 44, 46 formed into a lateral side surface 48 of the body 26. According to at least one embodiment, the faster apertures 44, 46 are internally threaded, however any suitable aperture may be employed. The fastener apertures 44, 46 each intersect and pass generally perpendicularly through one of the post apertures 28, 30. According the depicted embodiment, the fastener apertures 44, 46 are formed to a blind depth. However, pass-through apertures may also be employed, for example, depending on fastener lengths. Both of these options permit the fastener to engage both ends within the body 26. The fastener apertures 44, 46 each have a diameter less than the diameter of the corresponding post aperture 28, 30.

The electrical connector assembly 20 also includes a pair of fasteners, such as externally threaded socket head set screws 50, 52, each fastened into one of the fastener apertures 44, 46 and extending through the post through-aperture 40 to retain the corresponding post 22, 24 to the body 26. The electrical communication is provided at the connection by the mating surfaces 32, 34 of the conductive body 26 and the attached connector, such as wires, busbars, and the like, which are fixed to the contact surfaces 32, 34 of the body 26 by fastened attachment upon a post 22, 24.

The screws 50, 52 ensure robust mechanical fixation of a connector upon the body 26, while the body 26 transfers current from one conductor to the other. The posts 22, 24 and fasteners 50, 52 may be formed from less conductive materials than the body 26 to ensure structural integrity of attachment upon the conductive body 26.

Although the fasteners are disclosed as screws 50, 52, any suitable fastener may be employed, such a pin, including press-fit pins, hollow cylindrical seamed pins, split spring dowel tension roll pins, resilient cylindrical cotter pins, spring dowel pins, positioning pins, clevis pins, pivot pins, anti-rotation pins, and the like.

Figure 3:
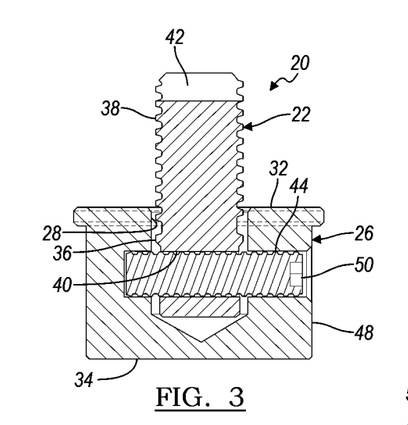
FIG. 3 is a side section view of the electrical connector assembly of FIG. 1.

The section view of FIG. 3 illustrates that the first set screw 50 is engaged in the threaded fastener aperture 44 on both sides of the through-aperture 40 to evenly distribute torques applied to the post 22 and to enhance the mechanical connection of the post 22 to the body 26 in comparison to the prior art.

Referring now to FIGS. 1-3, the electrical connector assembly 20 includes posts 22, 24 that are formed from commercially standard steel components. The commercial steel material of the posts 22, 24 provides a suitable mechanical fixation, while also structurally superior to withstand applicable mechanical loading due to torques and forces that are applied to the posts 22, 24. Many standard lengths, diameters, and threads are available without requiring dedicated tooling to manufacture the posts 22, 24, thereby minimizing costs in comparison to the prior art. Likewise, the set screws 50, 52 are also standardized commercial steel components for satisfying force and torque loading, while minimizing costs.

The body 26 is formed separately from the posts 22, 24. The body 26 is formed from a copper alloy material with a greater conductivity than the posts 22, 24 to enhance conductivity of the electrical connection. The body 26 may be designed for the specific application and is more cost effective to manufacture than an integral body with a pair of posts as in some prior art applications. By separating the posts 22, 24, the electrical connector 20 can be sized more compact than prior art designs. Additionally, by isolating the posts 22, 24, direct contact may be avoided such that if one post 22 is exposed to a contaminant, such as water, the other post 24 is not also directly exposed to the contaminant of the first post 22. A housing may be injection molded over the body 26 and the set screws 50, 52 to further isolate the posts 22, 24.

Figure 4:
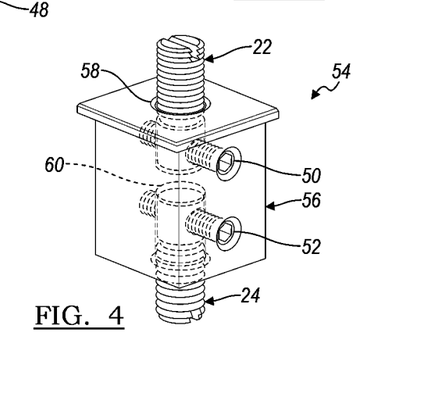
FIG. 4 is a front perspective view of an electrical connector assembly, according to another embodiment.

The electrical connector assembly 20 is adaptable to various applications. FIG. 4 illustrates another connector assembly 54 according to an embodiment, which is similar to the prior embodiment. The connector assembly 54 includes a body 56 with post apertures 58, 60 that are aligned so that the posts 22, 24 are aligned.

Figure 5:
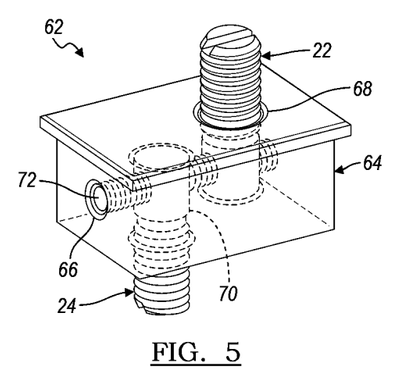
FIG. 5 is a front perspective view of an electrical connector assembly, according to another embodiment.

FIG. 5 illustrates a connector assembly 62 according to another embodiment, with a conductive body 64 wherein only one fastener aperture 66 is provided, intersecting and passing through both post apertures 68, 70. One threaded fastener or set screw 72 is provided to retain both of the posts 22, 24.

Figure 6:
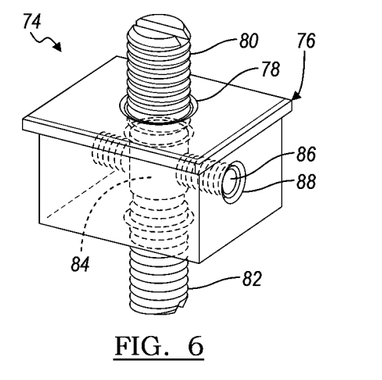
FIG. 6 is a front perspective view of an electrical connector assembly, according to another embodiment.

FIG. 6 illustrates another connector assembly 74 embodiment, with a conductive body 76 with one through post aperture 78 for a pair of integral posts 80, 82 with a common through-hole 84. One set screw 86 in a fastener aperture 88 secures the pair of posts 80, 82.

Figure 7:
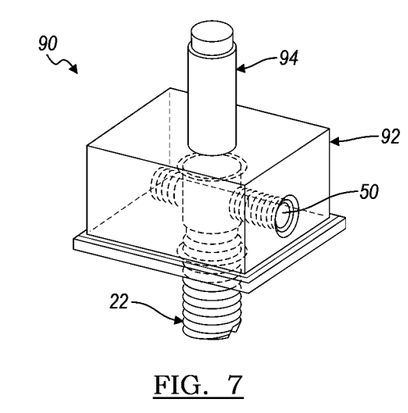
FIG. 7 is a front perspective view of an electrical connector assembly, according to another embodiment.

FIG. 7 depicts a connector assembly 90 according to another embodiment, with a conductive body 92 with one threaded post 22. A second post 94 extends from the body 92. According to one embodiment, the second post 94 is a cylindrical pin. According to at least one embodiment, the second post 94 is formed integral with the body 92.

Figure 8:
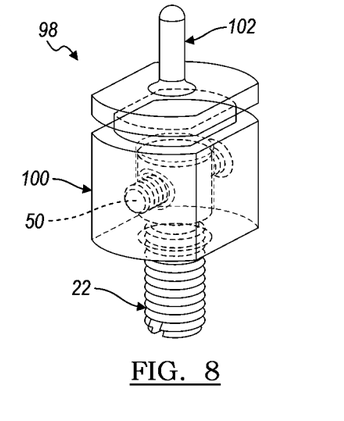
FIG. 8 is a front perspective view of an electrical connector assembly, according to another embodiment.

FIG. 8 depicts a connector assembly 98 according to another embodiment, with a conductive body 100 with one threaded post 22. A second post 102 extends from the body 100 with a smaller diameter than the first post 22. According to one embodiment, the second post 102 is a cylindrical pin. According to at least one embodiment, the second post 102 is formed integral with the body 100.

Figure 9:
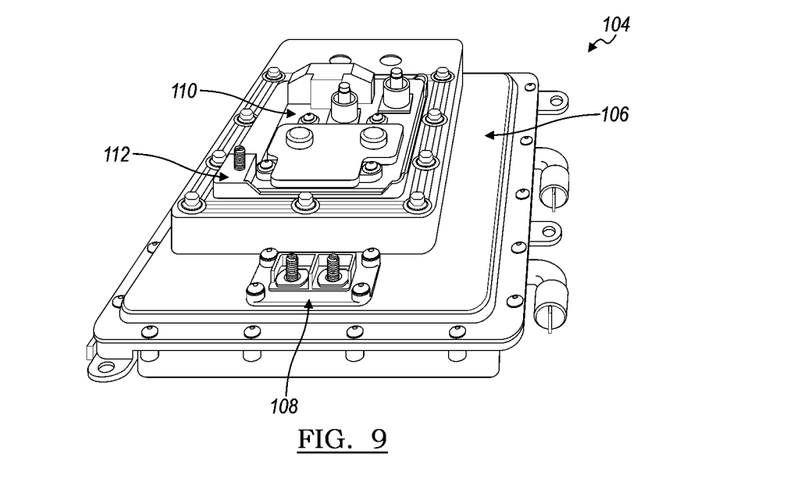
FIG. 9 is a front perspective view of a converter assembly, according to another embodiment.

FIG. 9 illustrates a direct current to direct current converter assembly 104 according to an embodiment. The converter assembly 104 includes a primary housing 106 with a converter (not shown) within the housing 106. A plurality of electrical connector assemblies 108, 110, 112 are attached to the housing 106 in electrical communication with the converter.

Figure 10:
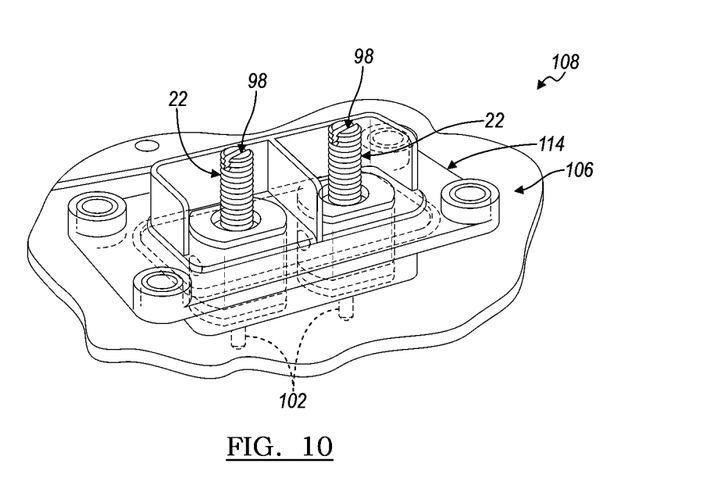
FIG. 10 is an enlarged front perspective view of an electrical connector assembly of the converter assembly of FIG. 9, according to another embodiment.

FIG. 10 illustrates the electrical connector assembly 108 in greater detail. The electrical connector assembly 108 includes a pair of electrical connector assemblies 98 from FIG. 8 with a plastic housing 114 overmolded over the pair of electrical connector assemblies 98. The connector housing 114 is attached to the converter housing 106 so that the second posts 102 extend into the converter housing 106 to provide electrical connections with the converter. The first posts 22 extend out of the connector housing 114 for receipt of an external electrical connector.

Referring again to FIG. 1, an external electrical connector 116 is illustrated with a terminal flange 118 connecting a wire 120 to the first post 22. A nut 122 is provided on the post 22 to retain the terminal flange 118 to the electrical connector assembly 20.

Figure 11:
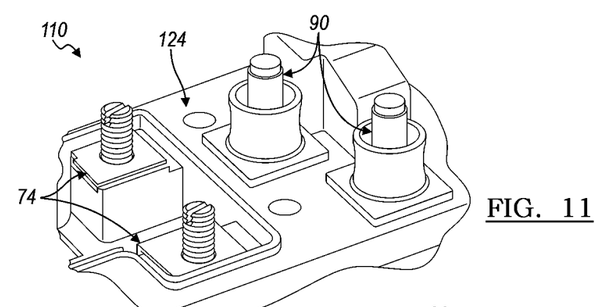
FIG. 11 is an enlarged front perspective view of an electrical connector assembly of the converter assembly of FIG. 9, according to another embodiment.
Figure 12:
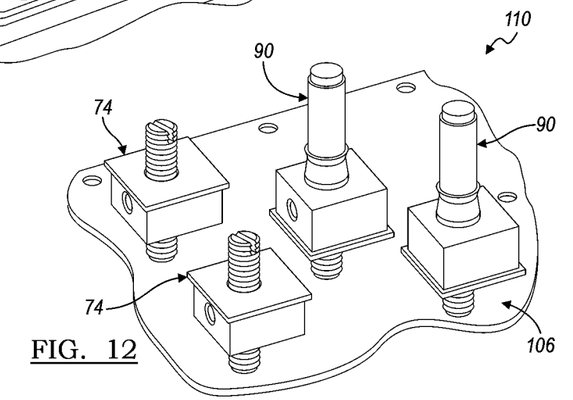
FIG. 12 is another enlarged front perspective view of the electrical connector assembly of FIG. 11, illustrated with a cover removed.

FIGS. 11 and 12 illustrate the electrical connector assembly 110 in greater detail. The electrical connector assembly 110 includes a pair of electrical connector assemblies 74 from FIG. 6 and a pair of electrical connector assemblies 90 from FIG. 7. A plastic housing 124 is molded over the pairs of electrical connector assemblies 74, 90 and is attached to the converter housing 106 for electrical communication with the converter and other electrical connectors.

Figure 13:
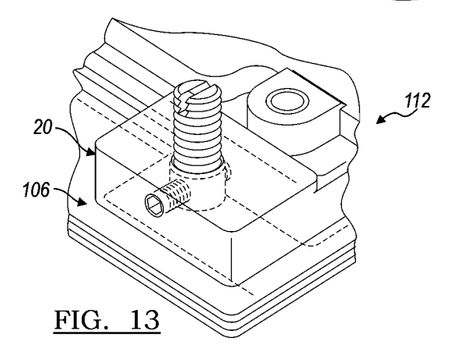
FIG. 13 is an enlarged front perspective view of an electrical connector assembly of the converter assembly of FIG. 9, according to another embodiment.

FIG. 13 illustrate the connector assembly 112 in greater detail, which is an electrical connector assembly, such as 20 from FIG. 1 molded directly into the converter housing 106.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrical connector assembly comprising:
   a conductive body with a first aperture formed therein, and a second aperture formed therein intersecting the first aperture;
   a first post with an aperture formed radially therethrough, the first post sized to be received within the first aperture of the conductive body with an end of the first post accessible externally from the conductive body for receipt of a first electrical connector;
   a fastener sized to be received within the second aperture of the conductive body and extend through the aperture in the first post to retain the first post in the conductive body for electrical communication between the first electrical connector and the conductive body; and
   a second post exposed externally from the conductive body for receipt of a second electrical connector for electrical communication with the first electrical connector; and
   wherein the first post is externally threaded at the end exposed externally from the conductive body.

2. The electrical connector assembly of claim 1 wherein the first aperture in the conductive body has a diameter greater than a diameter of the second aperture in the conductive body.

3. The electrical connector assembly of claim 2 wherein the second aperture of the conductive body passes through the first aperture of the conductive body.

4. The electrical connector assembly of claim 3 wherein the fastener passes through the first aperture of the conductive body.

5. The electrical connector assembly of claim 1 wherein the second aperture is internally threaded.

6. The electrical connector assembly of claim 5 wherein the fastener is externally threaded to engage the internal threads of the second aperture.

7. The electrical connector assembly of claim 1 wherein the conductive body is formed of a material with a greater conductivity than a material of the first post.

8. The electrical connector assembly of claim 1 wherein a tool receptacle is formed into the end of the first post exposed externally from the conductive body to align the aperture of the first post with the fastener.

9. The electrical connector assembly of claim 1 wherein the first post is exposed externally from a first side of the conductive body; and
   wherein the second post is exposed externally from a second side of the conductive body that is spaced apart and opposed from the first side.

10. The electrical connector assembly of claim 1 wherein the second post is formed integrally with the first post.

11. The electrical connector assembly of claim 1 wherein the second post is aligned axially with the first post.

12. The electrical connector assembly of claim 1 wherein the second post is offset axially from the first post.

13. The electrical connector assembly of claim 1 wherein the second post has an aperture formed radially therethrough for receipt of a fastener.

14. An electrical converter assembly comprising:
    an electrical converter;
    an electrical connector assembly according to claim 1, wherein the second post provides electrical connection between the conductive body and the electrical converter;
    an electrical connector connected to the first post for electrical communication with the electrical converter; and
    a housing mounted to the electrical converter to conceal the electrical connector assembly.

15. An electrical connector assembly comprising:
    a conductive body with a first aperture formed therein and a second aperture formed therein spaced apart from and not intersecting the first aperture;
    a first post sized to be received within the first aperture of the conductive body with an end of the first post exposed externally from the conductive body for receipt of a first electrical connector; and
    a second post sized to be received with the second aperture of the conductive body with an end of the second post exposed externally from the conductive body for receipt of a second electrical connector for electrical communication with the first electrical connector; and
    wherein the second post does not directly contact the first post to isolate the second post from contaminants that may be exposed to the first post.

16. An electrical connector assembly comprising:
    a conductive body with a first aperture formed therein, and a second aperture formed therein intersecting and passing through the first aperture, wherein the first aperture in the conductive body has a diameter greater than a diameter of the second aperture in the conductive body, and wherein the second aperture is internally threaded;
    a first post with an aperture formed radially therethrough, the first post sized to be received within the first aperture of the conductive body with an end of the first post accessible externally from a first side of the conductive body for receipt of a first electrical connector;
    an externally threaded fastener sized to be received within the second aperture of the conductive body to engage the internal threads of the second aperture, and to extend through the aperture in the first post, and extend through the first aperture of the conductive body, to retain the first post in the conductive body for electrical communication between the first electrical connector and the conductive body; and
    a second post exposed externally from a second side of the conductive body that is spaced apart and opposed from the first side, for receipt of a second electrical connector for electrical communication with the first electrical connector;
    wherein the conductive body is formed of a material with a greater conductivity than a material of the first post; and
    wherein a tool receptacle is formed into the end of the first post exposed externally from the conductive body to align the aperture of the first post with the fastener.

17. An electrical connector assembly comprising:
    a conductive body with a first aperture formed therein, and a second aperture formed therein intersecting the first aperture;
    a first post with an aperture formed radially therethrough, the first post sized to be received within the first aperture of the conductive body with an end of the first post accessible externally from the conductive body for receipt of a first electrical connector;
    a fastener sized to be received within the second aperture of the conductive body and extend through the aperture in the first post to retain the first post in the conductive body for electrical communication between the first electrical connector and the conductive body; and a second post exposed externally from the conductive body for receipt of a second electrical connector for electrical communication with the first electrical connector; and wherein a tool receptacle is formed into the end of the first post exposed externally from the conductive body to align the aperture of the first post with the fastener.

18. The electrical connector assembly of claim 17 wherein the tool receptacle is further defined as a driver slot.

19. An electrical connector assembly comprising:
a conductive body with a first aperture formed therein, and a second aperture formed therein intersecting the first aperture;
a first post with an aperture formed radially therethrough, the first post sized to be received within the first aperture of the conductive body with an end of the first post accessible externally from the conductive body for receipt of a first electrical connector;
a fastener sized to be received within the second aperture of the conductive body and extend through the aperture in the first post to retain the first post in the conductive body for electrical communication between the first electrical connector and the conductive body; and
a second post exposed externally from the conductive body for receipt of a second electrical connector for electrical communication with the first electrical connector;
wherein the first post is exposed externally from a first side of the conductive body; and
wherein the second post is exposed externally from a second side of the conductive body that is spaced apart and opposed from the first side.

20. An electrical connector assembly comprising:
a conductive body with a first aperture formed therein, and a second aperture formed therein intersecting the first aperture;
a first post with an aperture formed radially therethrough, the first post sized to be received within the first aperture of the conductive body with an end of the first post accessible externally from the conductive body for receipt of a first electrical connector;
a fastener sized to be received within the second aperture of the conductive body and extend through the aperture in the first post to retain the first post in the conductive body for electrical communication between the first electrical connector and the conductive body; and
a second post exposed externally from the conductive body for receipt of a second electrical connector for electrical communication with the first electrical connector; and
wherein the second post is aligned axially with the first post.

21. An electrical connector assembly comprising:
a conductive body with a first aperture formed therein, and a second aperture formed therein intersecting the first aperture;
a first post with an aperture formed radially therethrough, the first post sized to be received within the first aperture of the conductive body with an end of the first post accessible externally from the conductive body for receipt of a first electrical connector;
a fastener sized to be received within the second aperture of the conductive body and extend through the aperture in the first post to retain the first post in the conductive body for electrical communication between the first electrical connector and the conductive body; and
a second post exposed externally from the conductive body for receipt of a second electrical connector for electrical communication with the first electrical connector; and
wherein the second post has an aperture formed radially therethrough for receipt of a fastener.

22. The electrical connector assembly of claim 21 wherein a third aperture is formed in the conductive body intersecting the second aperture;
wherein the second post is sized to be received in the third aperture with the aperture of the second post aligned with the second aperture of the conductive body; and
wherein the fastener is sized to be received through the aperture of the second post to retain the second post in the conductive body for electrical communication between the second electrical connector and the conductive body.

23. The electrical connector assembly of claim 21 wherein a third aperture is formed in the conductive body, and a fourth aperture is formed in the conductive body intersecting the third aperture;
wherein the second post is sized to be received in the third aperture with the aperture of the second post aligned with the fourth aperture of the conductive body; and
wherein the electrical connector assembly further comprises a second fastener sized to be received within the fourth aperture of the conductive body and extend through the aperture of the second post to retain the second post in the conductive body for electrical communication between the second electrical connector and the conductive body.

24. An electrical converter assembly comprising:
an electrical converter;
an electrical connector assembly comprising:
a conductive body with a first aperture formed therein, and a second aperture formed therein intersecting the first aperture,
a first post with an aperture formed radially therethrough, the first post sized to be received within the first aperture of the conductive body with an end of the first post accessible externally from the conductive body for receipt of a first electrical connector,
a fastener sized to be received within the second aperture of the conductive body and extend through the aperture in the first post to retain the first post in the conductive body for electrical communication between the first electrical connector and the conductive body, and
a second post exposed externally from the conductive body for receipt of a second electrical connector for electrical communication with the first electrical connector;
wherein the second post provides electrical connection between the conductive body and the electrical converter;
an electrical connector connected to the first post for electrical communication with the electrical converter; and
a housing mounted to the electrical converter to conceal the electrical connector assembly.

\* \* \* \* \*